US009511732B2

(12) United States Patent
Dolcetti et al.

(10) Patent No.: US 9,511,732 B2
(45) Date of Patent: Dec. 6, 2016

(54) OCCUPANT PRESENCE AND CLASSIFICATION SYSTEM

(71) Applicant: TK Holdings Inc., Auburn Hills, MI (US)

(72) Inventors: Blaine Jerry Dolcetti, Pontiac, MI (US); Joseph Adam Schultz, Pontiac, MI (US); Daniel Nicholas Tabar, Pontiac, MI (US); Jeffrey Scott Bennett, Pontiac, MI (US)

(73) Assignee: TK Holdings Inc., Auburn Hills, MI (US)

( * ) Notice: Subject to any disclaimer, the term of this patent is extended or adjusted under 35 U.S.C. 154(b) by 0 days.

(21) Appl. No.: 14/603,066

(22) Filed: Jan. 22, 2015

(65) Prior Publication Data

US 2015/0203064 A1 Jul. 23, 2015

Related U.S. Application Data

(60) Provisional application No. 61/930,893, filed on Jan. 23, 2014.

(51) Int. Cl.
*B60R 21/015* (2006.01)
(52) U.S. Cl.
CPC .................. *B60R 21/015* (2013.01)
(58) Field of Classification Search
CPC .................................... B60R 21/015
USPC ........................................... 701/45
See application file for complete search history.

(56) References Cited

U.S. PATENT DOCUMENTS

| 6,283,504 | B1 | 9/2001 | Stanley et al. |
| 6,392,542 | B1 | 5/2002 | Stanley |
| 6,563,231 | B1 | 5/2003 | Stanley et al. |
| 6,577,023 | B1 * | 6/2003 | Stanley ............... B60N 2/002 307/10.1 |
| 6,703,845 | B2 | 3/2004 | Stanley et al. |
| 6,816,077 | B1 | 11/2004 | Shieh et al. |
| 6,825,765 | B2 | 11/2004 | Stanley et al. |
| 7,098,674 | B2 | 8/2006 | Stanley et al. |
| 7,180,306 | B2 | 2/2007 | Stanley et al. |
| 7,293,467 | B2 * | 11/2007 | Shank ................... B60N 2/002 73/780 |
| 7,306,283 | B2 * | 12/2007 | Howick ............... B60N 2/5678 219/219 |
| 7,656,169 | B2 | 2/2010 | Scheckenbach et al. |
| 7,671,740 | B2 | 3/2010 | Petereit et al. |

(Continued)

OTHER PUBLICATIONS

International Search Report mailed Apr. 20, 2015 issued in PCT/US2015/012389.

(Continued)

*Primary Examiner* — McDieunel Marc
*Assistant Examiner* — James E Stroud
(74) *Attorney, Agent, or Firm* — Gordon & Rees LLP

(57) ABSTRACT

An occupant classification system that includes a first sensing electrode located in a bottom of a vehicle seat and a second sensing electrode located in a back of the vehicle seat. The system includes a controller that is configured to control the supply of a first signal to the first electrode and a second signal to the second electrode. A measurement circuit is provided that is configured to measure a first property of the first signal and second property of the second signal. The controller is configured to classify an occupant using the first and second properties.

20 Claims, 4 Drawing Sheets

(56) References Cited

U.S. PATENT DOCUMENTS

| | | |
|---|---|---|
| 7,679,378 B2 | 3/2010 | Hawes et al. |
| 8,049,520 B2 | 11/2011 | Schleeh |
| 8,818,637 B2 | 8/2014 | Stanley et al. |
| 8,836,527 B2 | 9/2014 | Wendt et al. |
| 8,957,689 B2 | 2/2015 | Virnich et al. |
| 9,266,454 B2* | 2/2016 | Barfuss .................. B60N 2/002 |
| 2002/0003345 A1* | 1/2002 | Stanley .................. B60N 2/286 280/735 |
| 2006/0217862 A1 | 9/2006 | Sakai et al. |
| 2007/0193811 A1 | 8/2007 | Breed et al. |
| 2008/0094213 A1* | 4/2008 | Morgan .............. B60R 21/0152 340/552 |
| 2009/0292423 A1 | 11/2009 | Norton |
| 2011/0029203 A1 | 2/2011 | Watson et al. |
| 2013/0027065 A1 | 1/2013 | Stanley et al. |
| 2013/0207676 A1 | 8/2013 | Virnich et al. |
| 2013/0270874 A1* | 10/2013 | Lamesch ................ B60N 2/002 297/180.12 |
| 2013/0277351 A1* | 10/2013 | Lamesch ................ B60N 2/002 219/202 |
| 2013/0328577 A1* | 12/2013 | Satake ............... G01R 27/2605 324/688 |
| 2013/0334196 A1* | 12/2013 | Lamesch .............. B60N 2/5685 219/217 |
| 2013/0334844 A1* | 12/2013 | Lamesch ................ B60N 2/002 297/180.12 |
| 2014/0043047 A1* | 2/2014 | Fischer .................. B60N 2/002 324/654 |
| 2014/0097651 A1* | 4/2014 | Fortune ................ B60N 2/5685 297/180.12 |
| 2014/0125355 A1* | 5/2014 | Grant ..................... B64D 11/06 324/629 |
| 2014/0131344 A1* | 5/2014 | Lamesch ................ B60N 2/002 219/506 |
| 2014/0132042 A1* | 5/2014 | Midderhoff ............ A47C 7/748 297/180.12 |
| 2014/0151356 A1* | 6/2014 | Maguire ................ B62D 1/046 219/204 |
| 2014/0197942 A1* | 7/2014 | Tabaczynski .......... B60N 2/002 340/457.1 |
| 2014/0239980 A1* | 8/2014 | Ootaka .................. B60N 2/002 324/679 |
| 2014/0253151 A1* | 9/2014 | Kandler ................. B62D 1/046 324/686 |
| 2014/0285223 A1* | 9/2014 | Inoue ..................... B60N 2/002 324/688 |
| 2014/0339211 A1* | 11/2014 | Barfuss .................. B60N 2/002 219/202 |
| 2015/0048845 A1* | 2/2015 | Petereit ................ H03K 17/955 324/663 |
| 2015/0054317 A1* | 2/2015 | Fortune .................. B60N 2/002 297/180.12 |
| 2015/0202939 A1* | 7/2015 | Stettner ............... B60R 21/0134 701/37 |

OTHER PUBLICATIONS

Written Opinion mailed Apr. 20, 2015 issued in PCT/US2015/012389.

* cited by examiner

| OC | OP | AIRBAG | SBR |
|---|---|---|---|
| Region 1 | Region 1 | OFF | OFF |
| Region 1 | Region 2 | OFF | OFF |
| Region 2 | Region 1 | ON | OFF |
| Region 2 | Region 2 | ON | ON |
| Region 3 | Region 1 | OFF | OFF |
| Region 3 | Region 2 | ON | ON |

FIG. 4

OCCUPANT PRESENCE AND CLASSIFICATION SYSTEM

CROSS REFERENCE TO RELATED APPLICATIONS

The present application claims priority to and the benefit of U.S. Provisional Patent Application No. 61/930,893, filed on Jan. 23, 2014. The foregoing provisional application is incorporated by reference herein in its entirety.

BACKGROUND

The present application relates generally to the field of occupant classification systems for vehicle seating. Vehicle seats may include occupant classification systems to attempt to determine if the seat is occupied by an adult, a child, or no one. Vehicle seats may also include other auxiliary components such as seat heaters, empty seat detectors, and serialization components. Current occupant classification systems use the seat bottom heater to determine occupant classification, which helps in determining whether a protective device (e.g., an airbag) will deploy or not during a crash event. A control algorithm divides the data from the seat bottom heater into two regions to determine occupant classification; the first region indicating that the status is empty or small and the second region indicating that the status is either large or occupied.

Similar to the seat bottom heater, the seat back heater also has two regions. The seat back heater is used for object presence classification or seat belt reminder (SBR). Measurements located within the first region indicate that the seat belt reminder will be disabled (i.e. OFF) and measurements in the second region indicate that the seat belt reminder is enabled (i.e. ON).

The seat back heater algorithm also requires input from the occupancy classification status to help with the seat belt reminder status. In the event that the occupancy classification status is empty or small and the object presence classification is enabled the occupancy classification status overrides the object presence classification and disables (i.e. OFF) the seat belt reminder. This situation only occurs when the occupancy classification is empty/small or unoccupied otherwise the object presence classification reports its actual classification.

Using this method for determining occupant classification and seat belt reminder status works for all occupants and seat positions however it does not mitigate well enough for electronic devices. Therefore there are instances where an electronic device will cause a misclassification for occupant classification, such as by enabling the airbag without an occupant sitting in the seat.

BRIEF DESCRIPTION OF THE DRAWINGS

Features, aspects, and advantages of the present invention will become apparent from the following description, and the accompanying exemplary embodiments shown in the drawings, which are briefly described below.

FIG. 4 is a table showing an exemplary logic for instructions sent to a vehicle safety system.

DETAILED DESCRIPTION

The figures illustrate the exemplary embodiments in detail. However, it should be understood that the application is not limited to the details or methodology set forth in the description or illustrated in the figures. It should also be understood that the terminology is for the purpose of description only and should not be regarded as limiting.

Figure 1:
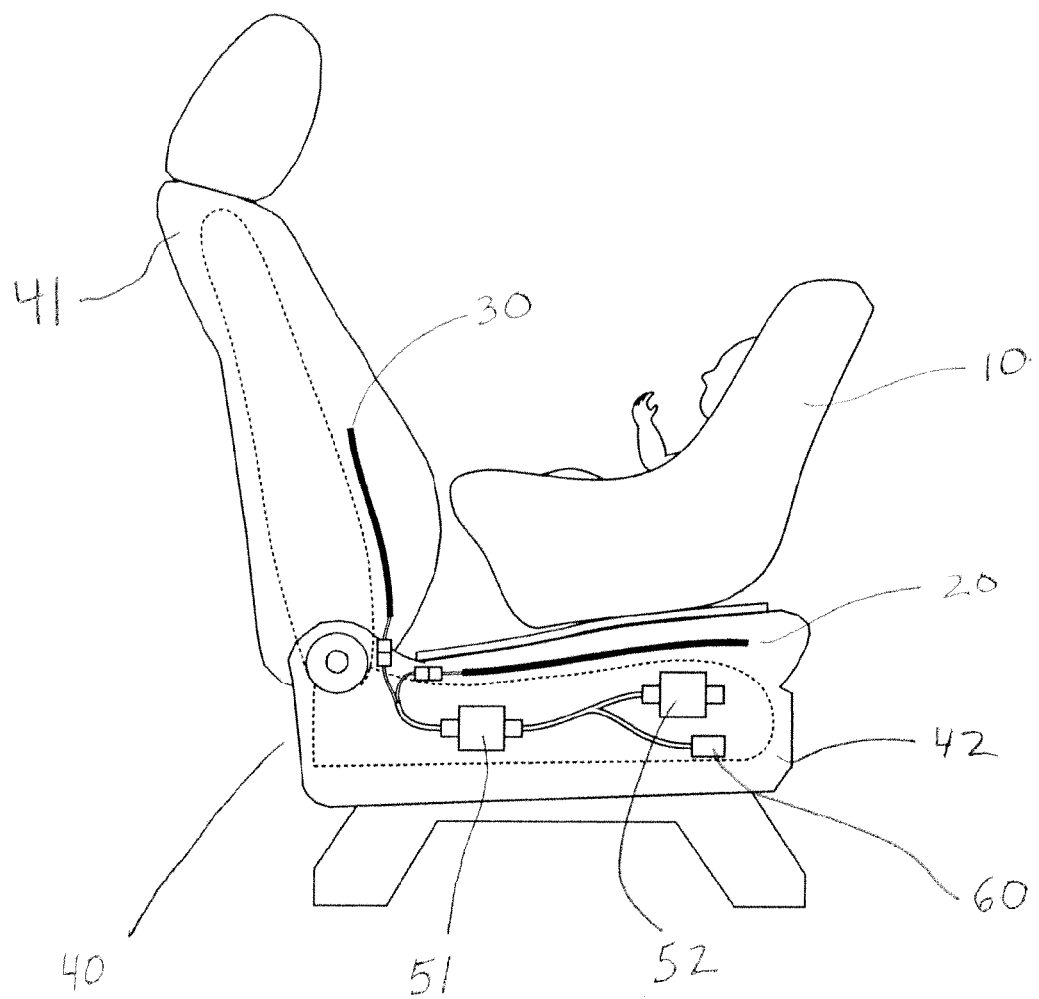
FIG. 1 is a schematic cross-section view of a vehicle seat including an occupant classification system according to an exemplary embodiment.

Referring to FIG. 1, a vehicle seat 40 is shown according to an exemplary embodiment. One or more seats that are configured to receive an occupant may be provided in a vehicle. The vehicle seat includes a generally horizontal lower portion or seat bottom 42 that is coupled to the vehicle and an upper portion or seat back 41 that extends upward from the rear end of the seat bottom. The seat back 41 may be connected to the seat bottom 42 through a recliner mechanism that allows the seat back to tilt or pivot relative to the seat bottom. Each of the seat bottom and the seat back include a supporting frame, a cushion such as a foam pad that is coupled to the frame, and a trim cover that surrounds the cushion. The trim cover may attach to the foam pad using a suitable fastener (e.g., hook and loop fasteners, hog rings, other attachment methods molded into the foam pad, etc.). The trim cover is also coupled to the frame structure (e.g., with j-clips, etc.) to couple the frame member, the trim cover, and the cushion together.

The occupant classification system may generally include a sensor, a shield, and electronics for sensing and classifying the occupancy of the seat. For example, the sensor may be used to provide measurements that correspond to the effect of an object on the sensor due to both the conductivity and weight of the object. Measurements from the sensor may be evaluated to determine the existence of an object or occupant in the seat. The occupant classification system may include or be configured to operate in conjunction with a seat heating system and/or other systems for the seat of the vehicle. Exemplary occupant classification systems are disclosed in U.S. Provisional patent application Ser. No. 13/633,590 filed Oct. 2, 2012 and U.S. patent application Ser. No. 14/152,471 filed Jan. 10, 2014. The foregoing applications are incorporated by reference herein. The system disclosed herein may be incorporated into the system disclosed in the application Ser. No. 14/152,471, for example. Or, the system disclosed in application Ser. No. 14/152,471 may be modified to incorporate the functions and disclosed herein.

An occupant classification system for a vehicle seat having a seat bottom 42 and a seat back 41 is shown in FIG. 1. The occupant classification system includes a first electrode 20 in the seat base or bottom 42, shown as a seat bottom heater or occupant classification (OC) sensor. As shown in FIG. 1, the heating wire or electrode may also function used as the sensor (i.e., "heater as sensor" or "HAS"). The electrode or conductor may be used as a sensing electrode for capacitive or electric field based sensing. The seat bottom sensor may be integrated into another system. The system may also include a conductor or electrode 20 located in the seat back, shown as a seat back heater or occupant presence (OP) sensor. As shown in FIG. 1, the conductors or electrodes located in the seat bottom and seat back may be used as heating devices. The seat may include a heater controller (e.g., heater ECU) 52 to control and regulate the supply of a voltage to the heaters (i.e., electrodes) in the seat bottom and/or the seat back and an electronic control unit (ECU) 51 coupled to the sensors in the seat bottom and/or seat back to detect and categorize an object or occupant in the seat. The ECU 51 may include sensing and measurement circuits.

If the sensor is integrated into the heater system (e.g., the same electrode being used for both heating and sensing), the heater controller 52 and the ECU 51 may be connected in series such that power and/or control signals may be provided to the conductor (i.e., sensing and heater device) by, for example, the heater controller 52 through the ECU 51. While the heater controller and the ECU are shown schematically in FIG. 1 as being provided under the seat bottom, in various embodiments the heater controller and/or the ECU may be provided elsewhere in the vehicle, such as in the vehicle dash, in a center console, etc. The heater and occupant sensing controllers 51, 52 may be integrated into a single controller. In other exemplary embodiments, the seat may not be a heated seat and may lack components such as heater devices and a heater controller. The system includes an interface 60 to connect to various components such as a power supply, ground and the vehicle controller area network (CAN). The system will provide data carried over the CAN via, for example, the CAN-L and CAN-H signals.

Each of the electrodes in the seat back and seat bottom may be incorporated into a sensor pad. The sensor pad may include a layered structure. The sensor pad and sensing electrode may be constructed in a variety of ways, and the method of construction is not considered limiting. For example, the sensor pad may be constructed using a rigid or a flexible circuit board using known printed circuit board techniques such as etching or deposition of conductive materials applied to a dielectric substrate. Alternately, the sensor pad may be the foam cushion or seat pad itself with a discrete conductor, such as a conductive film, sheet or mesh, as the sensing element. As described above, the sensing electrode may function as the seat heating element so as to provide a comfortable seating environment for the occupant. If heating is included, a temperature sensor may be disposed near a part of the heating element, which may be used for controlling the temperature of the seat. The controller 52 may include a temperature controller that incorporates a temperature measuring circuit which can receive measurements from the temperature sensor to determine the temperature of the sensor pad and a temperature generating circuit which may provide a signal to the heating element in order to control its operation so that a desired temperature of the seat can be maintained in a closed-loop process. The sensor pad may further include a shielding electrode for shielding the sensing electrode from interference from surrounding conductive components.

The occupant classification system may employ a capacitive sensing system sends a time varying voltage out to a single sensing element or sensor. The sensor may for example, be one or both of the electrodes shown in FIG. 1. The system includes a measurement circuit to measure a property such as the loading current (or impedance) to ground from the sensing element by monitoring the voltage signal provided to the sensing conductor or element. This measurement may utilize a signal or property of measure that is representative of the desired property to be measured (i.e., impedance or current). The time varying voltage applied to the sensor could take many shapes, although a preferred shape is a sinusoidal signal at frequencies between about 50 kHz and about 150 kHz. This loading current increases significantly when an adult occupant is on the seat and only slightly when there is a child seat, such as a rear-facing infant seat (RFIS) on the vehicle seat. Preferably, the signal (e.g., time varying voltage) applied to the electrodes in the vehicle seat is controlled by the controller 51.

The sensing system utilizes a measurement system to measure a property of the signal being provided to the electrodes. For example, the system may utilize a measurement system that measures the in-phase (I) and quadrature (Q) components of the current supplied to the sensing electrode via voltage signal. As an alternative, I and Q measurements need not be made. Instead, for example, the phase and amplitude of the current sent to the sensing electrode could be measured to gain equivalent information. According to an embodiment, the impedance from the sensing electrode to ground should be characterized such that capacitive components of the impedance affect the measurement differently than the resistive components of the impedance. Once the I and Q measurements/values (or other appropriate measurements) are obtained, a corresponding measured signal is provided to a controller or microprocessor preferably located in the ECU 51 of the occupant classification system. The controller may be configured to make an occupant classification determination (see, e.g., FIG. 4).

Also, for the voltage signal to the sensing electrode, time varying shapes may be used that are not sinusoidal signals. If this is the case, alternative methods of identifying the characteristics of the impedance could be used. For example, square pulses could be sent to the sensing electrode. The current sent out to the sensing electrode could be measured and characteristics such as the peak and rise time of the current pulse could be used to characterize the sensing electrode's impedance to ground. Alternatively, several pulses of different length could be sent out to the sensing electrode. Characteristics of the impedance could be derived by analyzing the relationship between the peak currents and the variation of the current with pulse length. In general, the principles of operation of the capacitive (i.e., electric field) sensor described herein can be the same as described in U.S. Patent Publication No. 2007/0192007, the entirety of which is incorporated by reference herein.

The seat back sensor is monitored separately from a sensor in the seat bottom to discriminate conductive objects on the seat from occupants. Because the measurement detected by monitoring a signal from the seat back sensor is different for an object in the seat than the measurement from a signal from the seat back sensor for an occupant in the seat, the occupant classification system can utilize the seat back sensor to differentiate between an object and an occupant, both of which may otherwise provide a signal that would trigger a system that only includes a sensor provided in the seat bottom. The occupant classification system may utilize sensed data to provide input to other vehicle systems, such as a vehicle safety system (e.g., an airbag system) or a seat belt reminder (SBR) system. For example, if the occupant classification system detects a signal indicating an adult occupant, it may provide a signal that would cause the airbag system to activate one or more airbags associated with the seat in a collision. If, however, the occupant classification system detects a signal indicating an empty seat or a seat containing an object such as child safety seat, it may provide a signal that would cause the airbag system to deactivate one or more airbags associated with the seat in a collision.

Figure 2:
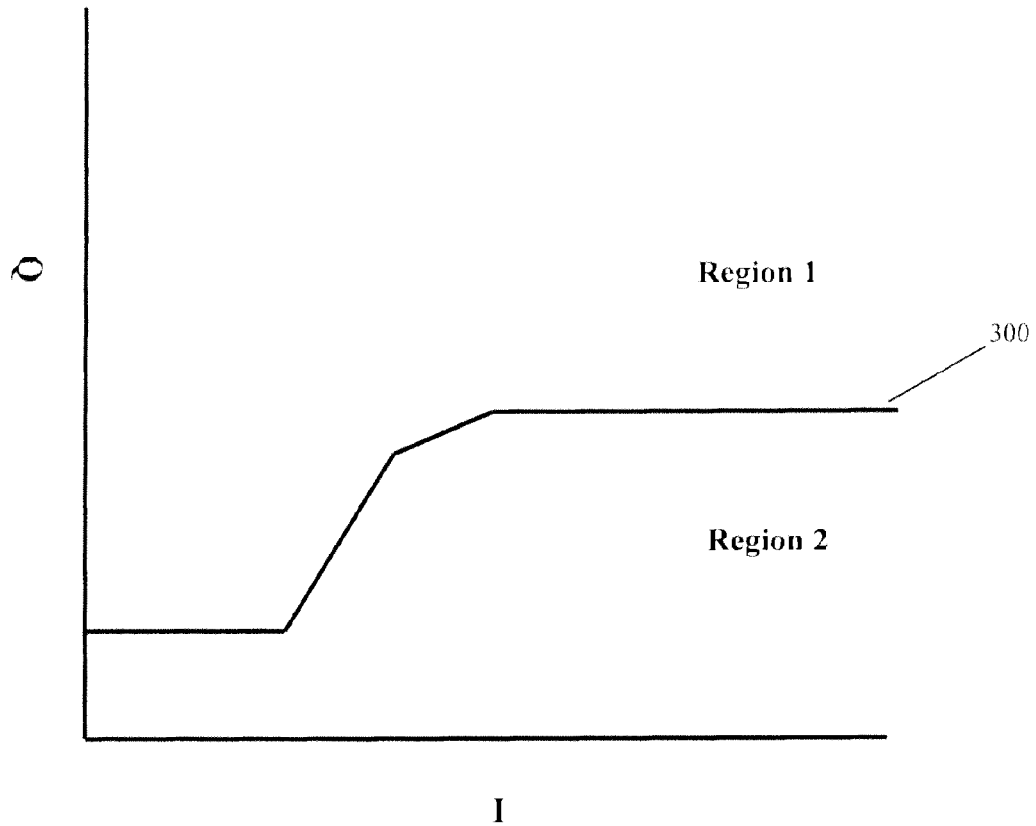
FIG. 2 is a chart showing several zones for a seat back sensor corresponding to various occupants of a seat.

As shown in FIG. 2, using I and Q components of the signal from the OP sensor, a threshold 300 (e.g., a third threshold) is determined establishing a first region and a second region. According to an exemplary embodiment, the threshold 300 is determined using the data points corresponding to an occupant of the seat leaning forward, plus an additional margin. The first region includes signals corresponding to electronic devices, child restraint seats, and an empty seat. The second region includes signals corresponding to other occupants, including a large occupant of the seat leaning forward, a large occupant of the seat touching the frame, a large occupant of the seat on an 11 mm blanket, and all other occupants of the seat.

Figure 3:
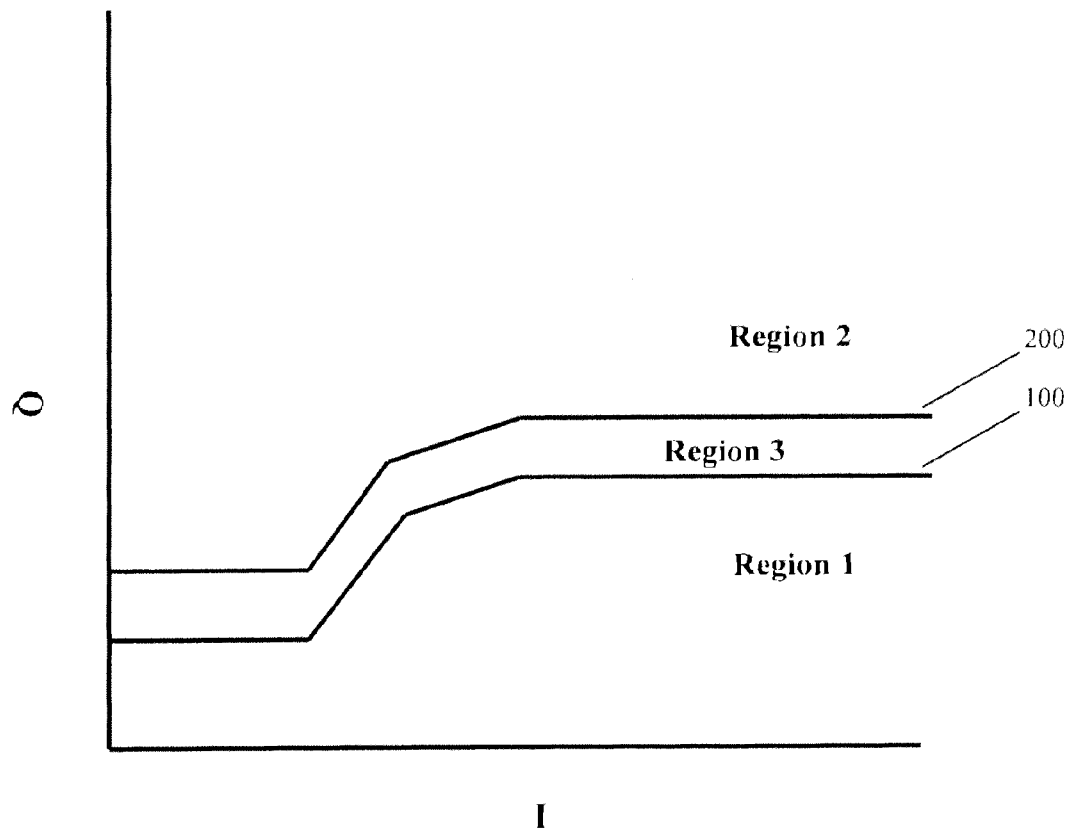
FIG. 3 is a chart showing several zones for a seat bottom sensor corresponding to various occupants of a seat.

As shown in FIG. 3, using I and Q components of the signal from the OC sensor, a first threshold 100 and a second threshold 200 are determined establishing a first region, a second region, and a third region. According to an exemplary embodiment, the first threshold or primary threshold 100 is determined using the data points corresponding to an occupant of the seat seated on a blanket having a thickness of 11 mm, plus an additional margin. The second threshold or secondary threshold 200 is determined using the data points corresponding to an occupant of the seat leaning forward, plus an additional margin, similar to the OP threshold described above. The first region includes signals corresponding to electronic devices, child restraint seats, and an empty seat. The second region includes signals corresponding to other occupants, including a large occupant of the seat leaning forward, a large occupant of the seat touching the frame, a large occupant of the seat on an 11 mm blanket, and all other occupants of the seat. The third region includes signals corresponding to electronic devices, a large occupant of the seat on an 11 mm blanket, and some other occupants.

Referring now to FIGS. 2 and 3, the regions established by the thresholds determined for both the OC sensor and the OP sensor can be used to classify the occupant of the seat and control various related systems, such as the airbag system or the SBR system. One example of a logic table for determining instructions sent to an SBR system by an occupant classification system having both an OC sensor and an OP sensor is shown in FIG.

As shown in FIG. 2, measurements by the OC sensor in region 1 indicate that the seat is occupied by a small occupant or is empty. This may be used to disable an airbag system associated with the seat. Measurements by the OC sensor in region 2 indicate that the seat is occupied by a large occupant. This may be used to activate an airbag system associated with the seat. Measurements by the OC sensor in region 3 are indeterminate and are further classified using measurements by the OP sensor.

As shown in FIG. 3, measurements by the OC sensor in region 1 indicate that the seat is occupied by a small occupant or is empty. This may be used to disable an SBR system associated with the seat. Measurements by the OP sensor in region 2 indicate that the seat is occupied by a large occupant. This may be used to activate an SBR system associated with the seat if the OP sensor also indicates a large occupant.

Region 3 of the OP sensor and the OC sensor are utilized to mitigate instances in which an electronic device may cause a misclassification for occupant classification. In the event that data is located in region 3 for the OC sensor as defined by the first threshold 100 and the second threshold 200, the algorithm will use the OP measurement to help determine the classification of the occupant. If the OP data is located in region 1, such as with an electronic device, the algorithm classifies the occupant as small/empty and treats it in the same way as an occupant with OC data in region 1. This may occur if the seat contains a conductive device and is either empty otherwise or contains a child in a child restraint system. If the OP data is located in region 2, such as with a large occupant on a blanket, the algorithm classifies the occupant as large and treats it in the same way as an occupant with OC data in region 2. This may occur if the seat contains a conductive device, but also contains an adult occupant. Once the occupant classification is determined for that measurement, the algorithm will disable the object presence classification from running and will associate the object presence classification to the occupant classification.

Referring to FIG. 4, if the OC data is in region 1 (i.e. a small/empty occupant), the airbag system may be disabled. If the OC data is in region 2 (i.e. a large occupant), the airbag system may be enabled. If the OP data is in region 2, the SBR system may also be enabled. The addition of the third region for occupant classification (OC) as well as the input of the seat back heater will provide additional inputs to determine proper classification for both occupant classification and seat belt reminder. When the OC data falls within region 3, the algorithm will then look at the seat back sensor to help determine the classification of the system. The algorithm will also force the status of the SBR system to be determined by the occupant classification status. Therefore if the OP sensor detects a large occupant, then the SBR system is enabled, along with the airbag system. If the OP sensor detects a small or empty occupant, then the SBR system is disabled, along with the airbag system.

The results of the measurements and classifications performed by the OP and OC systems may be provided to a vehicle safety system via a vehicle controller area network (CAN). For example, the OC and OP system controller may send data via the CAN to an airbag control module that would indicate that the airbag should be either enabled or disabled according to the algorithm results shown in the table of FIG. 4. Also, the OP and OC system controller may send data via the CAN to a vehicle seat belt reminder (SBR) controller that would indicate whether the SBR should provide an indication to the occupant of the seat to secure a seat belt system.

Establishing a secondary threshold for occupancy classification as well as integrating the use of the seat back heater to improves occupancy classification. The system can properly classify the occupant in the seat and prevent misclassifications due to electronic devices and other variants. The system can provide more a robust classification status, especially with electronic devices and worst case occupant positions (e.g., an occupant seated on a blanket). The system provides for more accurate enabling and disabling of the airbag as well as prevents the seat belt reminder from activating due to the presence of an electronic device on the seat. Using two sensors (e.g., sensing electrodes) located at different positions may reduce any classification issues resulting from an occupant being positioned in a worst case position, therefore improving performance and robustness.

The construction and arrangement of the elements of the occupant presence and classification system as shown in the various exemplary embodiments is illustrative only. Although only a few embodiments have been described in detail in this disclosure, those skilled in the art who review this disclosure will readily appreciate that many modifications are possible (e.g., variations in sizes, dimensions, structures, shapes and proportions of the various elements, values of parameters, mounting arrangements, use of materials, colors, orientations, etc.) without materially departing from the novel teachings and advantages of the subject matter recited herein. For example, elements shown as integrally formed may be constructed of multiple parts or elements, the position of elements may be reversed or otherwise varied, and the nature or number of discrete elements or positions may be altered or varied. It should be noted that the elements and/or assemblies of the system may be constructed from any of a wide variety of materials that provide sufficient strength or durability. Components such as those shown herein may be used in non-vehicle applications as well. Other substitutions, modifications, changes and omissions may be made in the design, operating conditions and arrangement of the preferred and other exemplary embodiments without departing from the scope of the present invention.

What is claimed is:

1. An occupant classification system for a vehicle comprising:
    a first sensing electrode located in a bottom of a vehicle seat;
    a second sensing electrode located in a back of the vehicle seat;
    a controller configured to control a supply of a first signal to the first electrode and a second signal to the second electrode; and
    a measurement circuit configured to monitor the first sensing electrode and the second sensing electrode and measure a first property of the first signal and a second property of the second signal,
    wherein the controller is configured to
        determine whether an object or an occupant occupies the vehicle based on the monitoring of the second sensing electrode, and
        classify a type of the occupant based on the first property of the first signal and the second property of the second signal when the occupant occupies the vehicle seat.

2. The occupant classification system of claim 1, wherein the controller includes the measurement circuit.

3. The occupant classification system of claim 1, wherein the controller is configured to provide an occupant classification signal to the vehicle to enable a protective device when a value of the first property exceeds a first threshold regardless of a value of the second property.

4. The occupant classification system of claim 3, wherein the controller is configured to
    compare the value of the first property to the first threshold and a second threshold,
    compare the second property to a third threshold, and
    provide an occupant classification signal to the vehicle to enable the protective device when the value of the first property exceeds the second threshold and is lower than the first threshold and when the value of the second property exceeds the third threshold.

5. The occupant classification system of claim 1, wherein the controller is configured to refrain from providing a seat belt reminder signal to the vehicle when the value of the second property is less than a third threshold regardless of the value of the first property.

6. The occupant classification system of claim 5, wherein the controller is configured to refrain from providing a seat belt reminder signal to the vehicle when the value of the first property is less than a second threshold lower than a first threshold and the value of the second property is higher than the third threshold.

7. The occupant classification system of claim 1, wherein the first property is representative of a quadrature component of the first signal and the second property is representative of a quadrature component of the second signal.

8. The occupant classification system of claim 3, wherein the first threshold varies depending on an in-phase component of the first signal.

9. The occupant classification system of claim 4, wherein the first threshold and the second threshold vary depending on an in phase component of the second signal.

10. The occupant classification system of claim 5, wherein the third threshold varies depending on an in-phase component of the second signal.

11. The occupant classification system of claim 1, wherein the system includes a heating controller for applying a heating voltage to at least one of the first sensing electrode and the second sensing electrode to produce heat for warming the seat.

12. An occupant classification and seat heating system for a vehicle comprising:
    a first sensing and heating electrode located in a bottom of a vehicle seat;
    a second sensing and heating electrode located in a back of the vehicle seat;
    a sensing controller that is configured to control a supply of a first signal to the first electrode and a second signal to the second electrode;
    a heating controller configured to control a supply of a heating voltage to the first sensing and heating electrode and the second sensing and heating electrode; and
    a measurement circuit configured to monitor the first sensing and heating electrode and the second sensing and heating electrode and measure a first property of the first signal and a second property of the second signal,
    wherein the sensing controller is configured to
        determine whether an object or an occupant occupies the vehicle based on the monitoring of the second sensing and heating electrode, and
        classify a type of the occupant based on the first property of the first signal and the second property of the second signal when the occupant occupies the vehicle seat.

13. The occupant classification and heating system of claim 12, wherein the sensing controller is configured to
    compare a value of the first property to a first threshold and a second threshold
    compare the second property to a third threshold, and
    to provide an occupant classification signal to the vehicle to enable a protective device when the value of the first property exceeds the second threshold and is lower than the first threshold and when the value of the second property exceeds the third threshold.

14. The occupant classification and heating system of claim 12, wherein the sensing controller is configured to refrain from providing a seat belt reminder signal to the vehicle when a value of the second property is less than a third threshold regardless of a value of the first property.

15. The occupant classification system of claim 14, wherein the sensing controller is configured to refrain from providing a seat belt reminder signal to the vehicle when the value of the first property is less than a second threshold lower than a first threshold and the value of the second property is higher than the third threshold.

16. The occupant classification system of claim 13, wherein the first property is representative of a quadrature component of the first signal and the second property is representative of a quadrature component of the second signal.

17. The occupant classification system of claim 16, wherein the first threshold varies depending on an in-phase component of the first signal.

18. The occupant classification system of claim 17, wherein the first threshold and the second threshold vary depending on an in phase component of the second signal.

19. The occupant classification system of claim 18, wherein the third threshold varies depending on an in-phase component of the second signal.

20. The occupant classification system of claim 12, wherein the sensing controller is configured to provide an occupant classification signal to the vehicle to enable a protective device when a value of the first property exceeds a first threshold regardless of a value of the second property.

* * * * *